(12) United States Patent
Ahmed

(10) Patent No.: US 12,357,962 B1
(45) Date of Patent: Jul. 15, 2025

(54) FABRICATION OF CA₃CO₄O₉/MgO NANOCOMPOSITE MATERIALS USING PECHINI SOL-GEL METHOD

(71) Applicant: IMAM MOHAMMAD IBN SAUD ISLAMIC UNIVERSITY, Riyadh (SA)

(72) Inventor: Ehab Abdelhamed Abdelrahman Ahmed, Riyadh (SA)

(73) Assignee: IMAM MOHAMMAD IBN SAUD ISLAMIC UNIVERSITY, Riyadh (SA)

( * ) Notice: Subject to any disclaimer, the term of this patent is extended or adjusted under 35 U.S.C. 154(b) by 0 days.

(21) Appl. No.: 19/067,005

(22) Filed: Feb. 28, 2025

(51) Int. Cl.
| | |
|---|---|
| *B01J 20/04* | (2006.01) |
| *B01J 20/06* | (2006.01) |
| *B01J 20/28* | (2006.01) |
| *B01J 20/30* | (2006.01) |
| *B01J 23/78* | (2006.01) |

(Continued)

(52) U.S. Cl.
CPC ............. *B01J 20/041* (2013.01); *B01J 20/06* (2013.01); *B01J 20/28004* (2013.01); *B01J 20/28019* (2013.01); *B01J 20/3028* (2013.01); *B01J 20/305* (2013.01); *B01J 20/3078* (2013.01); *B01J 23/78* (2013.01); *B01J 35/39* (2024.01); *B01J 35/393* (2024.01); *B01J 35/40* (2024.01); *B01J 35/51* (2024.01); *B01J 37/0018* (2013.01); *B01J 37/04* (2013.01); *B01J 37/084* (2013.01); *B01J 37/088* (2013.01); *C02F 1/288* (2013.01); *C02F 1/302* (2013.01); *C02F 1/725* (2013.01); *C02F 1/281* (2013.01);

(Continued)

(58) Field of Classification Search
None
See application file for complete search history.

(56) References Cited

U.S. PATENT DOCUMENTS 8,877,119 B2    11/2014   Jordan et al.

FOREIGN PATENT DOCUMENTS

| CN | 111514372 A | 8/2020 |
| CN | 112827467 A | 5/2021 |
| CN | 114989587 B | 7/2023 |

OTHER PUBLICATIONS

F. Delorme, et.al., "Thermoelectric properties of Ca3Co4O9—Co3O4 composites", Ceramics International, vol. 41, Issue 8, Apr. 24, 2015, pp. 10038-10043 (6 pages).

(Continued)

*Primary Examiner* — Chester T Barry
(74) *Attorney, Agent, or Firm* — Oblon, McClelland, Maier & Neustadt, L.L.P.

(57) ABSTRACT

A multiphase particulate nanocomposite material including, determined by X-ray diffraction (XRD): a monoclinic calcium cobalt oxide ($Ca_3Co_4O_9$) crystalline phase; and, a cubic magnesium oxide (MgO) crystalline phase. The multiphase nanocomposite material further inlcudes either: a hexagonal calcium carbonate ($CaCO_3$) crystalline phase and a cubic cobalt oxide ($Co_3O_4$) crystalline phase; or, a cubic calcium oxide (CaO) crystalline phase and a rhombohedral $Ca_3Co_2O_6$ crystalline phase. The ratio by weight of the monoclinic $Ca_3Co_4O_9$ crystalline phase and the cubic MgO crystalline phase is in a range of about 0.5 to 1.5:0.5 to 1.5:0.5 to 1.5.

20 Claims, 6 Drawing Sheets

(51) Int. Cl.
*B01J 35/30* (2024.01)
*B01J 35/39* (2024.01)
*B01J 35/40* (2024.01)
*B01J 35/51* (2024.01)
*B01J 37/00* (2006.01)
*B01J 37/04* (2006.01)
*B01J 37/08* (2006.01)
*C02F 1/28* (2023.01)
*C02F 1/30* (2023.01)
*C02F 1/72* (2023.01)
*C02F 101/10* (2006.01)
*C02F 101/30* (2006.01)

(52) U.S. Cl.
CPC ...... *C02F 2101/10* (2013.01); *C02F 2101/30* (2013.01); *C02F 2305/08* (2013.01); *C02F 2305/10* (2013.01)

(56) References Cited

OTHER PUBLICATIONS

Amirsalar Khandan. "A novel silicate ceramic-magnetite nanocomposite for biomedical application", Jul. 2017 (238 pages).

FABRICATION OF CA₃CO₄O₉/MgO NANOCOMPOSITE MATERIALS USING PECHINI SOL-GEL METHOD

BACKGROUND

Technical Field

The present disclosure is directed to nanocomposite materials, and more particularly, to $Ca_3Co_4O_9/Co_3O_4/CaCO_3/MgO$ and $Ca_3Co_2O_6/CaO/MgO/Ca_3Co_4O_9$ multiphase particulate nanocomposite materials fabricated by the Pechini sol-gel method.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

Presently, the development of advanced nanocomposite materials has gained significant attention in materials science due to their versatile application across various technological fields. The existing art has primarily focused on synthesizing nanocomposites with controlled properties; however, the existing synthetic methods face several limitations and often fail to achieve precise phase composition, uniform morphology, or enhanced crystallinity. Conventional synthesis methods often lead to inconsistencies in the material's properties, which hinder their widespread applicability in advanced technological applications.

The synthesis of calcium cobalt oxides and cobalt-based compounds has been extensively explored in the art, reflecting the potential utility of cobalt-based compounds in thermoelectric, catalytic, and electronic applications. However, it is considered that there is currently a primary focus in the art on individual material properties and not on ways to provide combinations of multiple functional phases within a single nanocomposite. For instance, the existing art related to calcium cobalt oxide nanomaterials largely focuses on their thermoelectric properties but does not explore combinations of calcium cobalt oxide with other functional materials, such as magnesium oxide or cobalt oxide. Similarly, whilst research investigating cobalt oxide nanocomposites has emphasized their catalytic and electronic applications, such research lacks compositions that may integrate multiple functional phases to achieve enhanced performance characteristics.

Despite significant advancements in the field of nanocomposite development, the current methodologies suffer from several drawbacks. The limitations of present methods include poor phase homogeneity, uncontrolled grain growth, and suboptimal material stability, which limitations restrict the potential use of the resultant nanocomposite for high-performance applications. In addition, existing synthesis techniques often require complex processing steps, extended reaction times, and high-temperature treatments, leading to increased energy consumption and production costs. Therefore, there is considered to exist a requirement to develop an improved synthesis approach that may overcome the aforementioned challenges while delivering nanocomposites with superior structural and functional properties. There is, in particular, considered to exist a need in the art to develop nanocomposites which may be employed for decontamination of wastewater, specifically industrial wastewater.

Accordingly, one object of the present disclosure is to provide a multiphase particulate nanocomposite material and method of preparation thereof that may circumvent the above listed drawbacks and limitations of the materials and methods already known in the art.

SUMMARY

In an exemplary embodiment, a multiphase particulate nanocomposite material is described. The multiphase particulate nanocomposite comprises, as determined by X-ray diffraction (XRD): a monoclinic calcium cobalt oxide ($Ca_3Co_4O_9$) crystalline phase; and, a cubic magnesium oxide (MgO) crystalline phase. The multiphase nanocomposite material further includes either: a hexagonal calcium carbonate ($CaCO_3$) crystalline phase and a cubic cobalt oxide ($Co_3O_4$) crystalline phase; or, a cubic calcium oxide (CaO) crystalline phase and a rhombohedral $Ca_3Co_2O_6$ crystalline phase. The ratio by weight of the monoclinic $Ca_3Co_4O_9$ crystalline phase and the cubic MgO crystalline phase is in a range of about (0.5 to 1.5):(0.5 to 1.5).

In some embodiments, the multiphase particulate nanocomposite material, as determined by X-ray diffraction, comprises: a monoclinic $Ca_3Co_4O_9$ crystalline phase; a cubic MgO crystalline phase; a hexagonal $CaCO_3$ crystalline phase; and, a cubic $Co_3O_4$ crystalline phase. The ratio by weight of the monoclinic $Ca_3Co_4O_9$ crystalline phase, the cubic MgO crystalline phase, and the sum of the hexagonal $CaCO_3$ crystalline phase and the cubic $Co_3O_4$ crystalline phase is in the range of about (0.5 to 1.5):(0.5 to 1.5):(0.5 to 1.5). The particulate nanocomposite may comprise agglomerates of substantially spherical particles. The particulate nanocomposite may have a volume average crystallite size, as determined by X-ray diffraction, of from about 50 nanometers (nm) to about 55 nm, preferably from about 51 to about 54 nm. The particulate nanocomposite may have a median volume particle size (Dv50) of from about 140 nm to about 160 nm, preferably from about 145 to about 155 nm, as determined by scanning electron microscopy (SEM).

In some embodiments, the multiphase particulate nanocomposite material, as determined by X-ray diffraction, comprises: a monoclinic $Ca_3Co_4O_9$ crystalline phase; a cubic MgO crystalline phase; a cubic CaO crystalline phase; and, a rhombohedral $Ca_3Co_2O_6$ crystalline phase. The ratio by weight of the monoclinic $Ca_3Co_4O_9$ crystalline phase, the cubic MgO crystalline phase, and the sum of cubic CaO crystalline phase and the rhombohedral $Ca_3Ca_2O_6$ crystalline phase is in a range of about (0.5 to 1.5):(0.5 to 1.5):(0.5 to 1.5). Further, the particulate nanocomposite of this embodiment may include agglomerates of substantially spherical particles. The particulate nanocomposite may have a volume average crystallite size, as determined by X-ray diffraction, of from about 65 nm to about 70 nm, preferably from about 66 to about 69 nm. The particulate nanocomposite may have a median volume particle size (Dv50) of from about 260 nm to about 290 nm, preferably from about 270 to about 280 nm, as determined by scanning electron microscopy.

In another exemplary embodiment, a method for preparing the particulate nanocomposite material is described. The method comprises: forming an aqueous mixture by adding an aqueous solution of a chelating agent into an aqueous solution of a calcium salt, a magnesium salt and a cobalt salt; adding a polyol into the aqueous mixture to form a gel; heating the gel under stirring at a temperature of from about 200° C. to about 400° C. for a sufficient duration to form a dry powder; and, calcining the dry powder at a temperature of from 500° C. to 900° C. to form the nanocomposite material.

In some embodiments, the aqueous solution of the chelating agent is added in a dropwise manner into the aqueous solution of the calcium salt, the magnesium salt and the cobalt salt.

In some embodiments, the calcium salt selected from the group consisting of calcium sulfate ($CaSO_4$), calcium nitrate ($Ca(NO_3)_2$), calcium chloride ($CaCl_2$), and calcium acetate ($Ca(CH_3COO)_2$). In some embodiments, the magnesium salt is selected from the group consisting of magnesium sulfate ($MgSO_4$), magnesium nitrate ($Mg(NO_3)_2$), magnesium chloride ($MgCl_2$) and magnesium acetate ($Mg(CH_3COO)_2$). In some embodiments, the cobalt salt is selected from the group consisting of cobalt sulfate ($CoSO_4$), cobalt nitrate ($Co(NO_3)_2$), cobalt chloride ($CoCl_2$) and cobalt acetate ($Co(CH_3COO)_2$).

In some embodiments, the calcium salt is calcium nitrate ($Ca(NO_3)_2$), the magnesium salt is magnesium nitrate ($Mg(NO_3)_2$), and the cobalt salt is cobalt acetate ($Co(CH_3COO)_2$).

In some embodiments, the chelating agent comprises at least one hydroxyalkyl carboxylic acid selected from the group consisting of citric acid ($C_6H_8O_7$), tartaric acid ($C_4H_6O_6$), malic acid ($C_4H_6O_5$), mandelic acid ($C_8H_8O_3$), and 12-hydroxystearic acid ($C_{18}H_{36}O_3$)

In some embodiments, the chelating agent comprises or consists of citric acid.

In some embodiments, the polyol is added in a dropwise manner into the aqueous mixture.

In some embodiments, the polyol has a number average molecular weight of from about 200 g/mol to about 5000 g/mol and a hydroxyl number of from about 25 milligrams of potassium hydroxide per gram (mg KOH/g) to about 500 mg KOH/g.

In some embodiments, the polyol is selected from the group consisting of polyester polyols, polyether polyols, poly(ether-ester) polyols, poly(alkylene carbonate) polyols, and mixtures thereof.

In some embodiments, the polyol includes a polyoxy($C_2$-$C_3$)alkylene polyol.

In some embodiments, the polyol includes a polyoxy($C_2$-$C_3$)alkylene polyol having a number average molecular weight of from about 200 grams per mole (g/mol) to about 5000 g/mol. and a hydroxyl number of from about 25 mg KOH/g to about 500 mg KOH/g.

In some embodiments, the method as described above, comprises calcining is performed at a temperature of from about 500° C. to about 650° C. for a duration of about 2 hours to about 4 hours to form the nanocomposite material including a hexagonal $CaCO_3$ crystalline phase and a cubic $Co_3O_4$ crystalline phase. In other embodiments calcining is performed at a temperature of from about 750° C. to about 900° C. for a duration of about 2 hours to 4 hours to form the nanocomposite material including a cubic CaO crystalline phase and a rhombohedral $Ca_3Co_2O_6$ crystalline phase.

In yet another exemplary embodiment, a method of immobilizing inorganic contaminants disposed in an aqueous medium is described. The method comprises contacting the aqueous medium with the aforementioned particulate nanocomposite material.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1A:
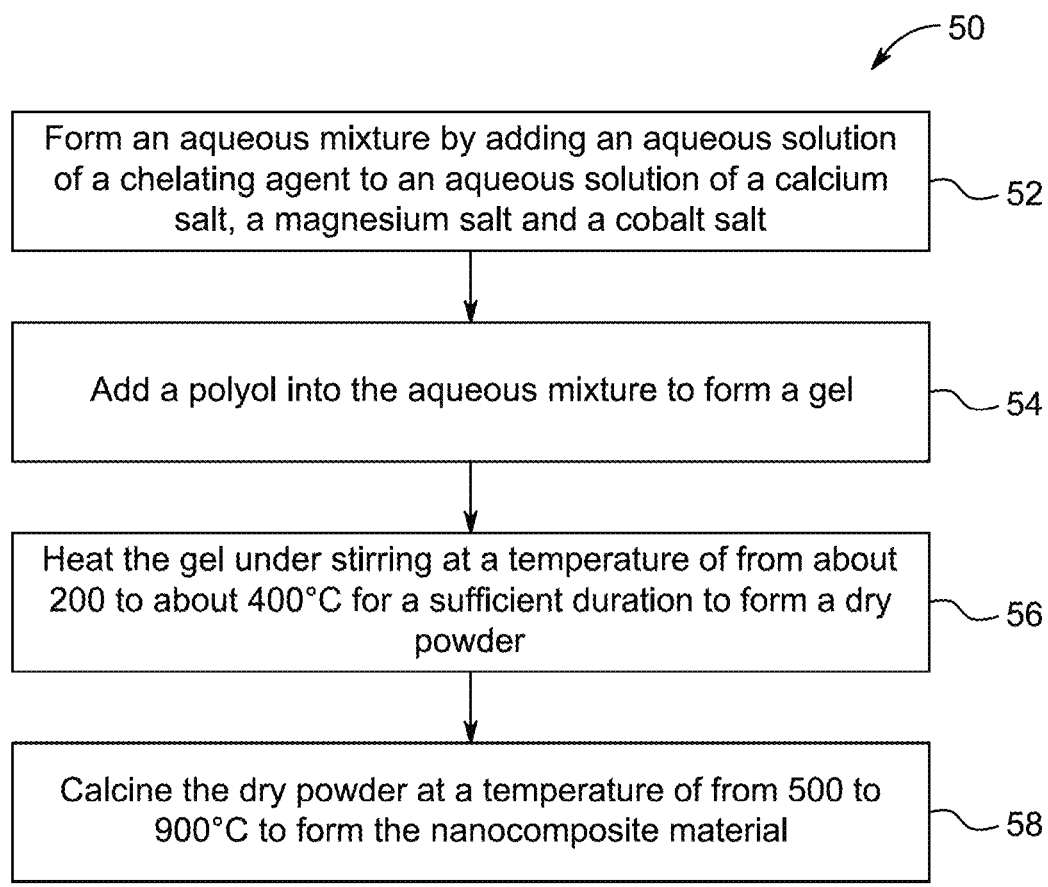
FIG. 1A illustrates an exemplary flow chart depicting a method for preparation of a multiphase particulate nanocomposite, according to certain embodiments.

Embodiments of the present invention will now be described more fully hereinafter with reference to the accompanying drawings wherever applicable, in that some, but not all, embodiments of the disclosure are shown.

When describing the present disclosure, the terms used are to be construed in accordance with the following definitions, unless a context dictates otherwise.

As used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

When amounts, concentrations, dimensions and other parameters are expressed in the form of a range, a preferable range, an upper limit value, a lower limit value or preferable upper and limit values, it should be understood that any ranges obtainable by combining any upper limit or preferable value with any lower limit or preferable value are also specifically disclosed, irrespective of whether the obtained ranges are clearly mentioned in the context.

A weight percent of a component, unless specifically stated to the contrary, is based on the total weight of the formulation or composition in which the component is included. For example, if a particular element or component in a composition or article is said to have 5 wt. %, it is understood that this percentage is in relation to a total compositional percentage of 100%.

As used herein, the term 'amount' refers to the level or concentration of one or more reactants, catalysts, or materials present in a reaction mixture.

As used herein, the term 'room temperature' refers to a temperature range of '23 degrees Celsius (° C.)±2° C.' in the present disclosure. As used herein, 'ambient conditions' means the temperature and pressure of the surroundings in which the substance, composition or article is located.

As used herein, the term number average molecular weight (Mn) and weight average molecular weight (Mw) are determined by gel permeation chromatography (GPC) with tetrahydrofuran (THF) as the eluent in accordance with DIN 55672-1:2007-08.

As used herein, the term 'fraction' refers to a numerical quantity which defines a part up to but not including 100 percent or the entirety of the thing in question.

As used herein the term 'disposed' refers to being positioned, placed, deposited, arranged or distributed in a particular manner.

In this application, a numerical value interval (i.e., a numerical value range) is involved, and, if not specifically stated, an optional numerical value distribution is considered continuous within the numerical value interval, and includes two numerical value endpoints (i.e., minimum and maximum values) of the numerical value range, and each numerical value between the two numerical value endpoints.

The temperature parameters in the present application, if not specifically limited, are both allowed to be constant temperature processing and also allowed to be varied within a certain temperature interval. It should be understood that the constant temperature processing allows the temperature to fluctuate within the precision range of the instrument control. It is allowed to fluctuate in the range of, for example, 5° C., 4° C., 3° C., 2° C., 1° C.

As used herein, the term 'particle' refers to a small object that acts as a whole unit with regard to its transport and properties. As used herein, 'nanoparticles'-sometimes contracted herein to NPs-refers to particles having a particle size of 1 nanometer (nm) to 1000 nm.

As used herein, the term 'nanocomposite' refers to a composite material in which at least one dimension of a component thereof is in the nanometer size scale (<100 nm). The nanocomposites are thus poly-phase solid materials made up of two or more nanomaterials. The term includes all types of multiphase solid material in which one of the phases has one, two, or three dimensions of less than 100 nm, or structures having nanoscale repeat distances between the different phases that make up the material.

Unless otherwise stated, the term "particle size" refers to the largest axis of the particle. In the case of a generally spherical particle, the largest axis is the diameter.

The term "median volume particle size" (Dv50), as used herein, refers to a particle size corresponding to 50% of the volume of the sampled particles being greater than and 50% of the volume of the sampled particles being smaller than the recited Dv50 value. Particle size is determined herein by Scanning Electron Microscopy.

The term "powder", as used herein, means a composition that consists of finely dispersed solid particles that are free-flowing.

The term "dry" as used herein means comprising less than 5 wt. % of any compound or composition being in liquid form when measured at 25° C. under ambient conditions. For instance, the term "dry" includes comprising less than 3 wt. %, less than 2 wt. %, less than 1%, or even about 0% of said compound or composition being in liquid form when measured at 25° C. under ambient conditions. Exemplary such compounds or compositions include water, oils, organic solvents and other wetting agents.

As used herein, the term "average crystallite size" refers to the mean size of the crystalline domains or particles within a material. It is typically determined using X-ray diffraction (XRD) analysis, where the broadening of diffraction peaks is related to the size of the crystallites. The average crystallite size provides insight into the degree of crystallinity and the structural characteristics of the material. It is commonly expressed in nanometers (nm) and reflects the typical dimensions of the crystalline regions in the material, excluding any amorphous regions or defects.

As used herein, the term 'X-ray diffraction' or 'XRD' or 'X-ray crystallography' refers to basic technique for obtaining information on the atomic structure of crystalline materials used as a standard laboratory technique. Unless otherwise specified, the XRD shall include an analytical technique based on the diffraction of X-rays by matter, especially for crystalline materials.

As used herein, the term 'Scanning Electron Microscopy' or 'SEM' refers to a surface-imaging technique that produces images of a sample by scanning the sample with a focused beam of electrons. Unless otherwise specified, the SEM shall include all imaging techniques using electron beams for imaging.

As used herein, the term "atomic concentration" refers to the proportion or percentage of a specific element in a material, calculated based on the number of atoms of that element relative to the total number of atoms present in the material. It is typically expressed as a percentage (%) or as an atomic fraction. This measurement may be determined using the exemplary techniques of X-ray fluorescence (XRF), energy-dispersive X-ray spectroscopy (EDX), or inductively coupled plasma mass spectrometry (ICP-MS). Where stated herein, atomic concentration is determined using energy-dispersive X-ray spectroscopy (EDX).

A hexagonal crystalline phase refers to a crystal lattice where atoms are arranged in a pattern that resembles a honeycomb, with three equal axes in a plane at 120° to each other, and a fourth axis perpendicular to that plane, often with a different length; this arrangement creates a repeating pattern of hexagonal shapes within the crystal.

A rhombohedral crystalline phase refers to a crystal lattice which has no angles equal to 90°, but of which all sides are of equal length (a=b=c), thus requiring only by one lattice parameter. All three angles are equal ($\alpha=\beta=\gamma$).

An orthorhombic crystalline phase refers to a crystal structure having three mutually perpendicular axes of unequal lengths (a≠b≠c). This means the crystal lattice forms a rectangular prism where the edges represent the three axes, all intersecting at 90-degree angles ($\alpha=\beta=\gamma=$) 90°.

A monoclinic crystalline phase refers to a crystal structure in which the unit cell of the material is characterized by three unequal axes, with two of them forming an angle that is not 90°, while the third axis is perpendicular to the plane formed by the other two axes. In other words, the monoclinic crystal system has one axis that is tilted, resulting in a lack of orthogonality between all three axes. The unit cell in the monoclinic phase is thus asymmetrical, with distinct axial lengths and one non-90° angle.

A cubic crystalline phase refers to a crystal structure where the unit cell is shaped like a cube, with three equal-length axes that are perpendicular to each other (at 90° angles). In this crystal system, the atoms or ions are arranged in a repeating pattern within the cubic lattice. The cubic crystalline structure is highly symmetric, possessing four threefold rotational axes and three fourfold rotational axes, permitting rotations of 90° around its specific axes and rotations of 120° about the body diagonals of the cube, while maintaining the same structure.

The term "actinic radiation" includes light with wavelengths of electromagnetic radiation ranging from the ultraviolet ("UV") light range, through visible light range, and into the infrared range. Actinic radiation generally has a wavelength of from 150 to 2000 nm.

The term 'dropwise' as used herein means that one discrete drop or aliquot of a liquid, irrespective of its size or volume, is administered at a time. Discrete drops or aliquots are administered consecutively: they may be provided at regular intervals, at irregular intervals or both such intervals may be applied over the course of administration of the liquid. Further, the volume of an aliquot or drop may be independently determined and thus may be varied over the course of administration of the liquid. Exemplary devices for dropwise addition of liquids include syringes and columns.

As used herein, the term 'Pechini sol-gel method' refers to the synthetic process used to produce metal oxide and composite materials by forming a sol through the polymerization of metal salts in a solvent, typically with the help of a chelating agent and an organic compound such as a polyol. The sol is then converted into a gel by the addition of a gelling agent, and, upon heating, the gel undergoes a transformation into a solid metal oxide or composite material.

The term 'sol' as used herein, refers to a colloidal suspension of solid particles in a continuous liquid medium.

As used herein, the term 'gel' refers to a viscoelastic or semi-solid phase that may form when a sol undergoes a transition to a more structured, three-dimensional network. This transition may occur through polymerization or crosslinking, typically facilitated by the addition of a gelling agent or by partial evaporation of the liquid medium of the sol. The result is a gel in which the liquid phase is entrapped within a solid network, creating a material that is freestanding or self-supporting—in that its yield value is greater than the sheer stress imposed by gravity—but which is still composed of a significant amount of liquid.

As used herein, the term 'calcination' refers to a thermal treatment process which is conducted in the absence of, or under a restricted supply of ambient oxygen. This is performed to remove impurities or volatile substances and/or to induce thermal decomposition or a change in the thermally treated material.

As used herein, '$C_1$-$C_n$ alkyl' group refers to a monovalent group that contains from 1 to n carbons atoms, that is a radical of an alkane and includes straight-chain and branched organic groups. As such, a '$C_1$-$C_4$ alkyl' group refers to a monovalent group that contains from 1 to 4 carbons atoms, that is a radical of an alkane and includes straight-chain and branched organic groups. Examples of alkyl groups include, but are not limited to: methyl; ethyl; propyl; isopropyl; n-butyl; isobutyl; sec-butyl; and, tert-butyl. In the present disclosure, such alkyl groups may be unsubstituted or may be substituted with one or more halogen. Where applicable for a given moiety (R), a tolerance for one or more non-halogen substituents within an alkyl group will be noted in the specification.

The term 'alkylene' refers to a divalent radical derived from an alkyl group as defined above.

The term 'polyoxyalkylene'-alternatively referenced as polyalkylene oxide-refers herein to an aliphatic polyether which is built from repeated —O-A- units, wherein A is alkylene, for instance $C_2$-$C_5$ alkylene. The term 'polyoxy($C_2$-$C_3$)alkylene' encompasses polyoxyethylene, polyoxypropylene and poly(oxyethylene-co-oxypropylene).

The term 'polyol' as used herein shall include diols and higher functionality hydroxyl compounds. The term 'polyether polyol' refers to a compound, which may be linear or branched, that contains at least two ether groups and at least two hydroxyl groups. The term 'polyester polyol' references a polymeric compound, which may be linear or branched, that contains at least two ester linkages and at least two hydroxyl groups. Correspondingly, the term 'poly(ether-ester) polyol' refers to a polyol containing both ether linkages (C—O—C) and ester linkages (R—COO—R) within its structure.

The term 'hydroxyl number' as used herein is defined as the mass in milligrams of potassium hydroxide required to neutralize the acetic acid taken up on acetylation of one gram of a chemical substance that contains free hydroxyl groups. Where stated, the hydroxyl number is determined in accordance with ASTM D4274-11.

The present disclosure is intended to include all hydration states of a given compound or formula, unless otherwise noted or when heating a material.

In addition, the present disclosure is intended to include all isotopes of atoms occurring in the present compounds and complexes. Isotopes include those atoms having the same atomic number but different mass numbers.

Aspects of the present disclosure are directed toward a multiphase particulate nanocomposite material that exhibits enhanced structural and functional properties, including increased durability. The multiphase particulate nanocomposite material is prepared by a controlled method from precursors including calcium salts, cobalt salts and magnesium salts. The resultant nanocomposite stands has structural diversity and demonstrates stability which may permit it to be used in advanced applications, such as in fields requiring materials with complex compositions and robust performance.

A multiphase particulate nanocomposite material is described. In some embodiments, the multiphase particulate nanocomposite material may comprise, as determined by X-ray diffraction: a monoclinic $Ca_3Co_4O_9$ crystalline phase; and, a cubic MgO crystalline phase.

In one embodiment, the multiphase particulate nanocomposite material has the general formula $Ca_3Co_4O_9/Co_3O_4/CaCO_3/MgO$ and includes: a monoclinic $Ca_3Co_4O_9$ crystalline phase; a cubic $Co_3O_4$ crystalline phase; a hexagonal $CaCO_3$ crystalline phase; and, a cubic MgO crystalline phase.

In some embodiments wherein crystalline phases of $Ca_3Co_4O_9/Co_3O_4/CaCO_3/MgO$ are present in the nanocomposite material, the ratio by weight of the monoclinic $Ca_3Co_4O_9$ crystalline phase, the cubic MgO crystalline phase and the sum of the hexagonal $CaCO_3$ crystalline phase and the cubic $Co_3O_4$ crystalline phase ranges from about (0.5-1.5):(0.5-1.5):(0.5-1.5), for example from about (0.5-1.0):(0.5-1.0):(0.5-1.0), from about (0.6-1.0):(0.6-1.0):(0.6-1.0), from about (0.7-1.2):(0.7-1.2):(0.7-1.2), from about (0.8-1.3):(0.8-1.3):(0.8-1.3), or, from about (1.0-1.5): (1.0-1.5):(1.0-1.5).

In one embodiment, the multiphase particulate nanocomposite material has the general formula $Ca_3Co_2O_6/CaO/MgO/Ca_3Co_4O_9$ and includes: a rhombohedral $Ca_3Co_2O_6$ crystalline phase; a cubic CaO crystalline phase; a cubic MgO crystalline phase; and, a monoclinic $Ca_3Co_4O_9$ crystalline phase.

In some embodiments wherein crystalline phases of $Ca_3Co_2O_6/CaO/MgO/Ca_3Co_4O_9$ are present in the nanocomposite material, the ratio by weight of the monoclinic $Ca_3Co_4O_9$ crystalline phase, the cubic MgO crystalline phase and the sum of the cubic CaO crystalline phase and the rhombohedral $Ca_3Co_2O_6$ crystalline phase ranges from about (0.5-1.5):(0.5-1.5):(0.5-1.5), for example from about (0.5-1.0):(0.5-1.0):(0.5-1.0), from about (0.6-1.0):(0.6-1.0):(0.6-1.0), from about (0.7-1.2):(0.7-1.2):(0.7-1.2), from about (0.8-1.3):(0.8-1.3):(0.8-1.3), or, from about (1.0-1.5):(1.0-1.5):(1.0-1.5).

In some embodiments, the $CaCo_4O_9/Co_3O_4/CaCO_3/MgO$ nanocomposite material has a volume average crystallite size, as determined by X-ray Diffraction, ranging from about 50 to about 55 nm. For example, the $Ca_3Co_4O_9/Co_3O_4/CaCO_3/MgO$ nanocomposite material may have a volume average crystallite size, as determined by X-ray Diffraction of from about 50-54 nm, about 51-54 nm, about 52-54 nm or about 52-53 nm. In a preferred embodiment, the crystallite size of the $Ca_3Co_4O_9/Co_3O_4/CaCO_3/MgO$ nanocomposite material is 52.86 nm.

In some embodiments, $Ca_3Co_2O_6/CaO/MgO/Ca_3Co_4O_9$ nanocomposite material has a volume average crystallite size, as determined by X-ray Diffraction, of from about 65 to about 70 nm. For example, the $Ca_3Co_2O_6/CaO/MgO/Ca_3Co_4O_9$ nanocomposite material may have a volume average crystallite size, as determined by X-Ray Diffraction, of from about 66-70 nm, about 67-69 nm or about 67-68 nm. In a preferred embodiment, the crystallite size of the $Ca_3Co_2O_6/CaO/MgO/Ca_3Co_4O_9$ nanocomposite is 67.52 nm.

In some embodiments, the morphology of the nanocomposite material comprises particles of substantial roundness. In particular, the nanocomposite material may comprise substantially spherical particles and agglomerates thereof. The nanocomposite material may include substantially spherical particles, granular particles and aggregates thereof.

In some embodiments, the $CaCo_4O_9/Co_3O_4/CaCO_3/MgO$ nanocomposite material has a median volume particle size (Dv50), as determined by Scanning Electron Microscopy ranging from about 140 to 160 nm. For example, the $CaCo_4O_9/Co_3O_4/CaCO_3/MgO$ nanocomposite material may have a median volume particle size (Dv50) of from about 140-155 nm, about 145-155 nm, or about 150-155 nm. In a preferred embodiment, the Dv50 of the $CaCo_4O_9/Co_3O_4/CaCO_3/MgO$ nanocomposite material is 151.80 nm.

In some embodiments, the $Ca_3Co_2O_6/CaO/MgO/Ca_3Co_4O_9$ nanocomposite material has a median volume particle size (Dv50), as determined by Scanning Electron Microscopy ranging from about 260 to 290 nm. For example, the $Ca_3Co_2O_6/CaO/MgO/Ca_3Co_4O_9$ nanocomposite material may have a median volume particle size (Dv50) of from about 260-285 nm, about 265-285 nm, about 270-285 nm, about 270-280 nm, or about 275-280 nm, as determined by Scanning Electron Microscopy. In a preferred embodiment, the Dv50 of the $Ca_3Co_2O_6/CaO/MgO/Ca_3Co_4O_9$ nanocomposite material is 275.94 nm.

In some embodiments, the atomic concentration of carbon (C) in the nanocomposite material having the $CaCo_4O_9/Co_3O_4/CaCO_3/MgO$ crystalline phases ranges from about 1 to about 5 atom %, for example from about 1 to about 4 atom %, from about 2 to about 4 atom %, or from about 3 to about 4 atom %. In a preferred embodiment, the atomic concentration of carbon (C) in the nanocomposite material having the $CaCo_4O_9/Co_3O_4/CaCO_3/MgO$ crystalline phases is 3.54 atom % of the total number of atoms.

In some embodiments, the atomic concentration of oxygen (O) in the nanocomposite material having the $CaCo_4O_9/Co_3O_4/CaCO_3/MgO$ crystalline phases ranges from about 50 to about 80 atom %, for example from about 50 to about 75 atom %, from about 60 to 75 atom % or from about 65 to about 75 atom %. In a preferred embodiment, the atomic concentration of oxygen (O) in the nanocomposite material having the $CaCo_4O_9/Co_3O_4/CaCO_3/MgO$ crystalline phases is 70.65 atom % of the total number of atoms.

In some embodiments, the atomic concentration of magnesium (Mg) in the nanocomposite material ranges having the $CaCo_4O_9/Co_3O_4/CaCO_3/MgO$ crystalline phases is from about 5 to about 15 atom %, for example from about 8 to about 12 atom %, from about 9 to about 12 atom %, from about 10 to about 12 atom % or from about 10 to about 11 atom %. In a preferred embodiment, the atomic concentration of magnesium (Mg) in the nanocomposite material having the $CaCo_4O_9/Co_3O_4/CaCO_3/MgO$ crystalline phases is 10.94 atom % of the total number of atoms.

In some embodiments, the atomic concentration of calcium (Ca) in the nanocomposite material having the $CaCo_4O_9/Co_3O_4/CaCO_3/MgO$ crystalline phases ranges from about 5 to about 15 atom %, for example from about 5 to about 10 atom %, from about 5 to about 9 atom %, from about 6 to about 9 atom %, from about 7 to about 9 atom % or from about 7 to about 8 atom %. In a preferred embodiment, the atomic concentration of calcium (Ca) in the nanocomposite material having the $CaCo_4O_9/Co_3O_4/CaCO_3/MgO$ crystalline phases is 7.98 atom % of the total number of atoms.

In some embodiments, the atomic concentration of cobalt (Co) in the nanocomposite material having the $CaCo_4O_9/Co_3O_4/CaCO_3/MgO$ crystalline phases ranges from about 5 to about 15 atom %, for example from about 5 to about 10 atom %, from about 5 to about 9 atom %, from about 5 to about 8 atom %, from about 6 to about 8 atom % or from about 6 to about 7 atom %. In a preferred embodiment, the atomic concentration of cobalt (Co) in the nanocomposite material having the $CaCo_4O_9/Co_3O_4/CaCO_3/MgO$ crystalline phases is 6.89 atom % of the total number of atoms.

In some embodiments, the atomic concentration of carbon (C) in the nanocomposite material having the $Ca_3Co_2O_6/CaO/MgO/Ca_3Co_4O_9$ crystalline phases ranges from about 0 to about 2 atom %, for example from about 0 to about 1 atom %. In a preferred embodiment, the atomic concentration of carbon (C) in the nanocomposite material having the $Ca_3Co_2O_6/CaO/MgO/Ca_3Co_4O_9$ crystalline phases is about 0 atom % of the total number of atoms.

In some embodiments, the atomic concentration of oxygen (O) in the nanocomposite material having the $Ca_3Co_2O_6/CaO/MgO/Ca_3Co_4O_9$ crystalline phases ranges from about 60 to about 90 atom %, for example from about 65 to about 90 atom %, from about 70 to 90 atom %, from about 75 to 90 or from about 75 to about 85 atom %. In a preferred embodiment, the atomic concentration of oxygen (O) in the nanocomposite material is 80.05 atom % of the total number of atoms.

In some embodiments, the atomic concentration of magnesium (Mg) in the nanocomposite material ranges having the $Ca_3Co_2O_6/CaO/MgO/Ca_3Co_4O_9$ crystalline phases is from about 5 to about 15 atom %, for example from about 8 to about 12 atom %, from about 8 to about 11 atom %, from about 9 to about 11 atom % or from about 9 to about 10 atom %. In a preferred embodiment, the atomic concentration of magnesium (Mg) in the nanocomposite material having the $Ca_3Co_2O_6/CaO/MgO/Ca_3Co_4O_9$ crystalline phases is 9.85 atom % of the total number of atoms.

In some embodiments, the atomic concentration of calcium (Ca) in the nanocomposite material having the $Ca_3Co_2O_6/CaO/MgO/Ca_3Co_4O_9$ crystalline phases ranges from about 2 to about 10 atom %, for example from about 4 to about 10 atom %, from about 4 to about 8 atom %, or from about 4 to about 6 atom %. In a preferred embodiment, the atomic concentration of calcium (Ca) in the nanocomposite material having the $Ca_3Co_2O_6/CaO/MgO/Ca_3Co_4O_9$ crystalline phases is 5.12 atom % of the total number of atoms.

In some embodiments, the atomic concentration of cobalt (Co) in the nanocomposite material having the $Ca_3Co_2O_6/CaO/MgO/Ca_3Co_4O_9$ crystalline phases ranges from about 2 to about 10 atom %, for example from about 2 to about 8 atom %, from about 2 to about 6 atom %, from about 3 to about 6 atom %, from about 4 to about 6 atom % or from about 4 to about 5 atom %. In a preferred embodiment, the atomic concentration of cobalt (Co) in the nanocomposite material having the $Ca_3Co_2O_6/CaO/MgO/Ca_3Co_4O_9$ crystalline phases is 4.98 atom % of the total number of atoms.

FIG. 1A illustrates a schematic flow chart of a method 50 of preparing particulate nanocomposite material. The order in which the method 50 is described is not intended to be construed as a limitation, and any number of the described method steps can be combined to implement the method 50. Additionally, individual steps may be removed or skipped from the method 50 without departing from the spirit and scope of the present disclosure.

At step 52, the method 50 includes forming an aqueous mixture by adding an aqueous solution of a chelating agent to an aqueous solution of a calcium salt, a magnesium salt and a cobalt salt. In some embodiments, the aqueous solution of the chelating agent is added in a dropwise manner into the aqueous solution of the calcium salt, a magnesium salt and a cobalt salt.

In some embodiments, the water of the aqueous solution may be tap water, distilled water, bi-distilled water, deionized water, deionized distilled water, reverse osmosis water or any combination thereof. In a preferred embodiment, the water is distilled water.

In certain embodiments, the molar ratio of Ca:Mg:Co in the admixture formed in step 52, and to which the polyol is added at Step 54 of the method illustrated in FIG. 1, may be from about (0.8-1.2):(0.8-1.2):(3.2-4.8), for example from about (0.9-1.1):(0.9-1.1):(3.6-4.4). In certain embodiments, the molar ratio of Ca:Mg:Co in the aqueous solution is about 1:1:4.

Exemplary calcium salts having utility in the present method—and which may be used alone or in combination—include but are not limited to calcium carbonate, calcium chloride, calcium sulfate, calcium hydroxide, calcium acetate, calcium citrate, calcium phosphate, calcium oxide, calcium silicate, calcium bromide, calcium iodide, calcium fluoride, calcium lactate, calcium formate, calcium benzoate, calcium tartrate, calcium gluconate, calcium pyrophosphate, calcium carbonate hydroxide, calcium bisphosphate, calcium phosphonate, calcium pyrite, calcium acetate phosphate, calcium aluminate, calcium molybdate, calcium chromate, calcium tungstate, calcium tartrate malate, calcium oxalate, calcium nitrate tetrahydrate, calcium borate, and calcium lactate gluconate. In some embodiments, the calcium salt is selected from the group consisting of calcium sulfate, calcium nitrate, calcium chloride, and calcium acetate. In a preferred embodiment, the calcium salt is calcium nitrate.

Exemplary magnesium salts having utility in the present method—and which may be used alone or in combination—include but are not limited to magnesium chloride, magnesium sulfate, magnesium carbonate, magnesium oxide, magnesium fluoride, magnesium bromide, magnesium iodide, magnesium hydroxide, magnesium citrate, magnesium malate, magnesium lactate, magnesium gluconate, magnesium ascorbate, magnesium tartrate, magnesium perchlorate, magnesium phosphate, magnesium stearate, magnesium pyrophosphate, magnesium silicate, magnesium borate, magnesium nitrate, magnesium formate, magnesium acetate, magnesium hypophosphite, magnesium tungstate, magnesium thiosulfate, magnesium nitride, magnesium aluminate, and magnesium succinate. In some embodiments, the magnesium salt is selected from the group consisting of magnesium sulfate, magnesium nitrate, magnesium chloride and magnesium acetate. In a preferred embodiment, the magnesium salt is magnesium nitrate hexahydrate ($Mg(NO_3)_2 \cdot 6H_2O$).

Exemplary cobalt salts having utility in the present method—and which may be used alone or in combination—include but are not limited to cobalt chloride, cobalt sulfate, cobalt nitrate, cobalt bromide, cobalt iodide, cobalt phosphate, cobalt carbonate, cobalt oxide, cobalt fluoride, cobalt formate, cobalt benzoate, cobalt tartrate, cobalt gluconate, cobalt pyrophosphate, cobalt lactate, cobalt hydroxide, cobalt silicate, cobalt molybdate, cobalt chromate, cobalt tungstate, cobalt oxalate, cobalt aluminate, cobalt borate, cobalt sulfate heptahydrate, cobalt chloride hexahydrate, cobalt acetate phosphate, cobalt hydrogen phosphate, cobalt ferrite, cobalt pyrite, cobalt hydrosulfide, and cobalt stearate. In some embodiments, the cobalt salt is selected from the group consisting of cobalt chloride, cobalt sulfate, cobalt nitrate, cobalt bromide, cobalt acetate, and/or mixtures thereof. In a preferred embodiment, the cobalt salt is cobalt acetate ($Co(CH_3COO)_2$).

As used herein, the term 'chelating agent' refers to the chemical compound that can form multiple bonds with a single metal ion, resulting in a stable, ring-like structure known as a chelate complex. The agent has multiple donor atoms (e.g., oxygen, nitrogen, sulphur) that can coordinate with the metal ion, effectively clawing the metal and preventing it from engaging in other chemical reactions. This multidentate binding increases the stability of the metal complex compared to simple, monodentate ligands.

Exemplary compounds, which may be used alone or in combination in the chelating agent, include but are not limited to ethylenediaminetetraacetic acid (EDTA), diethylenetriaminepentaacetic acid (DTPA), nitrilotriacetic acid (NTA), ethyleneglycoltetraacetic acid (EGTA), oxalic acid, tartaric acid, malic acid, ascorbic acid, lactic acid, gluconic acid, acetic acid, fumaric acid, salicylic acid, thiolactic acid, gluconamide, alanine, cysteine, glutamic acid, glycine, histidine, methionine, proline, thiourea, urea, phosphoric acid, phosphonic acid, boric acid, adipic acid, oxamatic acid, and 2,2'-bipyridine. In some embodiments, the chelating agent includes a hydroxyalkyl carboxylic acid selected from the group consisting of citric acid, tartaric acid, malic acid, mandelic acid and 12-hydroxystearic acid. In a preferred embodiment, chelating agent comprises or consists of citric acid.

In some embodiments, aqueous solution of the chelating agent may be added to aqueous solution of the calcium salt, the magnesium salt and the cobalt salt using various methods, such as steady pouring, spraying, stirring during addition, gradual injection, or gentle layering. In a preferred embodiment, aqueous solution of the chelating agent is introduced to the aqueous solution of the calcium salt, the magnesium salt and the cobalt salt in a dropwise manner.

The total amount of chelating agent added, optionally in the dropwise manner, at method step 52 of FIG. 1 is at least equimolar and, more typically, in slight molar excess to the total number of moles of calcium, magnesium and cobalt in the aqueous solution. In certain embodiments, the ratio of the total number of moles of chelating agent to the total number of moles of calcium, magnesium and cobalt is from about 1:1 to about 2:1, for example from about 1:1 to about 1.5:1 or from about 1:1 to about 1.3:1.

At step 54, the method 50 includes adding a polyol into the aqueous mixture to form a gel. In some embodiments, the polyol is added in a dropwise manner into the aqueous mixture. The method allows control of the reaction between the reactants resulting in functional diversity and stability of the nanocomposite material.

Without intention to be bound by theory, the polyol may serve to control the formation of agglomerated particles during the synthesis of the metal oxide nanoparticles through the aqueous sol-gel method. Typically herein, the polyol has: a number average molecular weight of from about 200 to about 5000 g/mol., preferably from about 200 to about 1000 g/mol. and more preferably from 200 to 500 g/mol.; and, a hydroxyl number of from about 25 to about 500 mg, more preferably 200 to 500 mg, and yet more preferably 200 to 300 mg KOH/g.

The polyols having utility in the present disclosure may be monomeric compounds, for instance monomeric aliphatic, cycloaliphatic or aromatic compounds having from 2 to 6 hydroxyl groups per molecule. Exemplary monomeric diols, which may be used alone or in combination include: ethylene glycol; propylene glycol; 1,3-propane diol; 1,2-butane diol; 2-methyl propanediol; 1,3-butane diol; 1,4-butane diol; 2,3-butanediol; neopentyl glycol; hexanediol; decanediol; hexamethylene glycol; cyclohexane dimethanol; polyoxyalkylene glycols, such as diethylene glycol, dipropylene glycol, triethylene glycol, tetraethylene glycol, tripropylene glycol and tetrapropylene glycol; and, aromatic diols such as bisphenol A, bisphenol F, hydrogenated bisphenol A and hydrogenated bisphenol F. Exemplary triols, which may be used alone or in combination include: 1,2,3-propanetriol; 1,2,4-butanetriol; 2-ethyl-2-hydroxymethyl-1,3-propanediol (trimethylolpropane); 3-methyl-1,3,5-pentanetriol; 1,2,3-hexanetriol; 1,2,6-hexanetriol; 2,5-dimethyl-1,2,6-hexanetriol; 1,2,3-heptanetriol; 1,2,3-octanetriol; and, 2-hydroxymethyl-1,3-propanediol. Exemplary tetrols and pentols include: 2,2-bis(hydroxymethyl) propane-1,3-diol (pentaerythritol); pentose; pentopyranose; 6-deoxyhexopyranose; 2,5-anhydrohexitol; 1,5-anhydrohexitol; 6-deoxyhexose; 1-deoxyhexitol; and, pentitol. An exemplary polyol having six hydroxyl groups is D-glucitol (sorbitol).

The present disclosure also provides for the use of polymeric polyols. In an embodiment, the polyol is selected from the group consisting of: polyester polyols; polyether polyols; poly(ether-ester) polyols; poly(alkylene carbonate) polyols; and, mixtures thereof.

Polycarbonate diols having utility herein may be obtained by reacting carbonic acid derivatives with diols. Exemplary carbonic acid derivatives are diaryl carbonates including but not limited to diphenyl carbonate, di($C_1$-$C_6$)alkyl carbonates and phosgene. Exemplary diols include but are not limited to: ethylene glycol; 1,2-propanediol; 1,3-propanediol; 1,3-butanediol; 1,4-butanediol; 1,5-pentanediol; 1,6-hexanediol; cyclohexane dimethanol; diethylene glycol; dipropylene glycol; neopentylglycol; and, mixtures thereof.

Polyester diols having utility herein may be obtained by reacting diols with either aliphatic, aromatic or cycloaliphatic dicarboxylic acids or, in some circumstances, the corresponding anhydrides thereof: the reaction may optionally take place in the presence of an esterification catalyst. Examples of suitable dicarboxylic acids include but are not limited to: adipic acid; glutaric acid; pimelic acid; suberic acid; nonanedicarboxylic acid; decanedicarboxylic acid; succinic acid;

maleic acid; sebacic acid; azelaic acid; terephthalic acid; isophthalic acid; o-phthalic acid;

tetrahydrophthalic acid; hexahydrophthalic acid; trimellitic acid; and, 1,4-cyclohexanedicarboxylic acid. Examples of suitable anhydrides include succinic, o-phthalic and trimellitic anhydride. It is noted that various commercially available dimeric fatty acids in saturated (hydrogenated) or unsaturated form may also be used as the dicarboxylic acid. And examples of suitable diols for the preparation of the polyester diols are: ethanediol; di-, tri- or tetraethylene glycol; 1,2-propanediol; di-, tri-, tetrapropylene glycol; 1,3-propanediol; 1,4-butanediol; 1,3-butanediol; 2,3-butanediol; 1,6-hexanediol; 1,5-pentanediol; 2,2-dimethyl-1,3-propanediol (neopentylglycol); 1,4-dihydroxycyclohexane; 1,4-dimethylcyclohexane; 1,8-octanediol; 1,10-decanediol; 1,12-decanediol; 2,2,4- and/or 2,4,4-trimethyl-1,3-pentanediol; and, mixtures thereof.

Other useful polyester diols are those obtainable from diol initiated polymerization of hydroxycarboxylic acids containing from 2 to 12 carbon atoms or a lactone thereof. The hydroxycarboxylic acids may be saturated or unsaturated, linear or branched, of which example include: glycolic acid; lactic acid; 5-hydroxy valeric acid; 6-hydroxy caproic acid; ricinoleic acid; 12-hydroxy stearic acid; 12-hydroxydodecanoic acid; 5-hydroxydodecanoic acid; 5-hydroxydecanoic acid; and. 4-hydroxydecanoic acid. Examples of suitable lactones are β-propiolactone, δ-valerolactone, ($C_1$-$C_6$)alkyl-valerolactone, ε-caprolactone and ($C_1$-$C_6$)alkyl-ε-caprolactone.

In an embodiment, the polyol is a polyether polyol. Exemplary polyether polyols may be obtained from the polymerization of a cyclic oxide—such as ethylene oxide, propylene oxide or butylene oxide—or by the addition of one or more such oxides to polyfunctional initiators having at least two active hydrogen atoms, such as water, polyhydric alcohols, polythiols, polyamines and alkanolamines.

In a preferred embodiment, the polyol comprises a polyoxy ($C_2$-$C_3$)alkylene polyol having: a number average molecular weight of from about 200 to about 5000 g/mol.; and, an hydroxyl number of from about 25 to about 500 mg KOH/g. For example, the polyol may comprise a polyoxy ($C_2$-$C_3$)alkylene polyol having: a number average molecular weight of from about 200 to about 1000 g/mol. or from about 200 to about 500 g/mol; and, an hydroxyl number of from about 200 to about 500 mg KOH/g. or from about 200 to 300 mg KOH/g. Polyethylene glycol (PEG) 400 may be mentioned as an exemplary polyoxy ($C_2$-$C_3$)alkylene polyol.

Referring back to FIG. 1, at step 54 of the method, the total amount of polyol added, optionally in a dropwise manner, is conventionally determined by the observed gel formation. However, in certain embodiments, the molar ratio of the total amount of added polyol to the total moles of Ca, Mg and Co of may be from about 1:10 to about 1:2, for example from about 1:10 to about 1:4 or from about 1:10 to about 1:6.

At step 56, the method 50 includes heating the gel under stirring at a temperature of from about 200 to about 400° C. for a sufficient duration to form a dry powder. In some embodiments, the gel is heated under stirring at a temperature ranging from about 200 to about 350° C., for example from about 200 to about 300° C., from about 210 to about 290° C., from about 220 to about 280° C., from about 230 to about 270° C. or from about 240 to about 260° C. In a preferred embodiment, the gel is heated at 250° C. In some embodiments, the heating can be performed by using heating appliances such as ovens, microwaves, autoclaves, hot plates, heating mantles and tapes, oil baths, salt baths, sand baths, air baths, hot-tube furnaces, and hot-air guns. In some embodiments, the gel is heated for a duration of from about 5 minutes to about 12 hours, for example from about 30 minutes to about 4 hours, from about 30 minutes to about 2 hours, or from about 30 minutes to about 90 minutes in order to form the dry powder.

At step 58, the method 50 includes calcining the dry powder at a temperature of from about 500 to about 900° C. to form the nanocomposite material. In a first embodiment of the calcination step 58, the dry powder is calcined to at a temperature ranging from about 500 to about 650° C., for example from about 550-625° C., or about 575625° C., to form the nanocomposite material having a hexagonal $CaCO_3$ crystalline phase and a cubic $Co_3O_4$ crystalline phase. In a preferred embodiment, dry powder is calcined at about 600° C. to form the nanocomposite material having a hexagonal $CaCO_3$ crystalline phase and a cubic $Co_3O_4$ crystalline phase.

In some embodiments, the dry powder is calcined for a duration ranging from about 2 to about 4 hours, for example about 2-2.5 hours, about 2.5-3 hours, about 3-3.5 hours, or about 3.5-4 hours, to form the nanocomposite material having a hexagonal $CaCO_3$ crystalline phase and a cubic $Co_3O_4$ crystalline phase. In a preferred embodiment, dry powder is calcined for about 3 hours to form the nanocomposite material having a hexagonal $CaCO_3$ crystalline phase and a cubic $Co_3O_4$ crystalline phase.

In other embodiments, the dry powder is calcined at a temperature ranging from about 750 to about 900° C., for example about 750-770° C., about 770-790° C., about 790-820° C., about 820-850° C. or about 850-900° C. to form the nanocomposite material having a cubic CaO crystalline phase and a rhombohedral $Ca_3Co_2O_6$ crystalline phase. In a preferred embodiment, dry powder is calcined at about 800° C. to form the nanocomposite material having a cubic CaO crystalline phase and a rhombohedral $Ca_3Co_2O_6$ crystalline phase.

In some embodiments, the dry powder is calcined for a duration of from about 2 to about 4 hours, including about 2-2.5 hours, about 2.5-3 hours, about 3-3.5 hours, or about 3.5-4 hours to form the nanocomposite material having a cubic CaO crystalline phase and a rhombohedral $Ca_3Co_2O_6$ crystalline phase In a preferred embodiment, the dry powder is calcined for about 3 hours to form the nanocomposite material having a cubic CaO crystalline phase and a rhombohedral $Ca_3Co_2O_6$ crystalline phase.

It is not precluded in the present method, that the particles directly obtained from the calcination step may be subjected to at least one of comminution, homogenization or classification in order to moderate the particle size distribution thereof.

In some embodiments, a heterogeneous catalyst is provided which includes the particulate nanocomposite material. A heterogeneous catalyst is a catalyst that exists in a different phase from the reactants in a chemical reaction. Herein, where the catalyst will comprise a particulate solid, the reactants may be gases and/or liquids. The catalytic process involves the reactants adsorbing onto the surface of the solid catalyst, where the reaction takes place, and then desorbing the products after the reaction. The catalyst itself remains chemically unchanged during the reaction. Where there are no substantial deposits on the nanocomposite and the catalyst maintains its structural integrity during the catalyzed reaction, a heterogenous catalyst comprising the particulate nanocomposite may be reused.

A method of immobilizing inorganic contaminants disposed in an aqueous medium is also described. The method includes contacting the aqueous medium with the particulate nanocomposite material as described hereinabove. This method relies on the adsorption of the inorganic contaminants—of which metal ions dissolved in wastewater may be mentioned as important examples—onto the particulate nanocomposite material.

A method of degrading organic pollutants disposed in an aqueous medium is still further described. The method includes contacting the aqueous medium with the particulate nanocomposite material as described herein while irradiating the aqueous medium with actinic irradiation.

Exemplary organic pollutants include, but are not limited to: dyes; phenols; polycyclic aromatic hydrocarbons (PAH); organic herbicides; organic pesticides, including organic algicides, fungicides, bactericides, virucides, insecticides and miticides; and, persistent organic pollutants. For completeness, a persistent organic pollutant is a toxic organic chemical that adversely affects human and environmental health, can be transported by wind and water, and can persist for years, decades, or centuries owing to resistance to environmental degradation by natural chemical, biological, or photolytic processes. Persistent organic pollutants are regulated by the United Nations Environment Programme (UNEP), 2001 Stockholm Convention on Persistent Organic Pollutants.

The methods of immobilizing inorganic contaminants and of photocatalytic degradation of organic pollutants both require an aqueous medium to be brought into contact with the particulate nanocomposite material for a sufficient contact time to permit adsorption of the species concerned. The aqueous medium may be provided as a static volume in which the nanocomposite material is dispersed. In an alternative embodiment, the aqueous medium may be provided as fixed volume in which the nanoparticulate is dispersed but which is subjected to agitation: the nanoparticulate material may be suspended in the volume or may be constrained within a bed or membrane or by a support. In a further non-limiting alternative, the aqueous medium may be provided as a flow which contacts the particulate nanocomposite material. In this embodiment, the particulate nanocomposite material may need to be constrained within a bed or membrane which the aqueous medium contacts as either a perpendicular or tangential (cross-) flow stream.

The following examples are provided solely for illustration and are not to be construed as limitations of the present disclosure, as many variations thereof are possible without departing from the spirit and scope of the present disclosure.

EXAMPLES

The following examples demonstrate a multiphase particulate nanocomposite material and a method of preparation thereof. The examples are provided solely for illustration and are not to be construed as limitations of the present disclosure, as many variations thereof are possible without departing from the spirit and scope of the present disclosure.

Figure 1B:
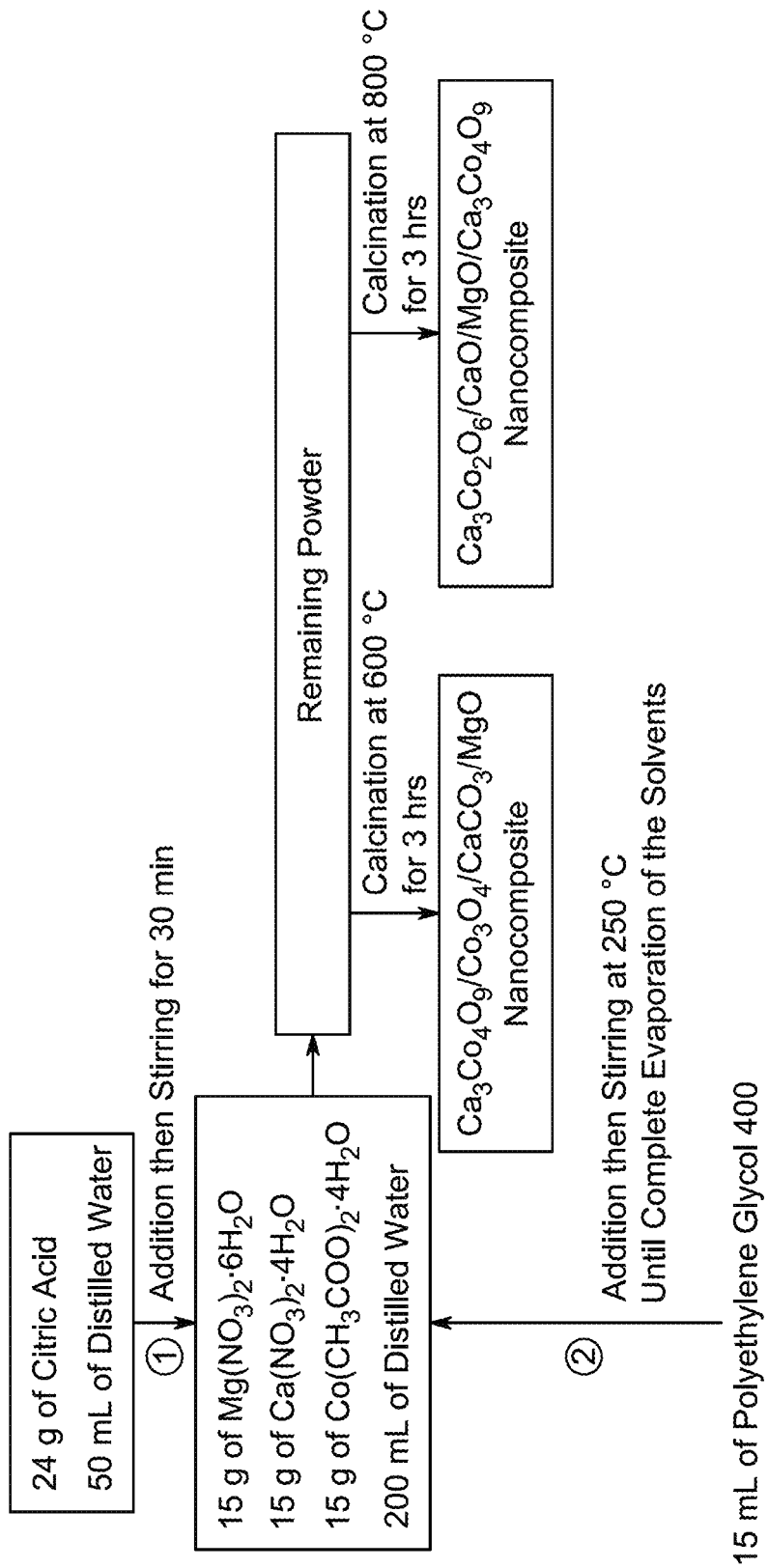
FIG. 1B shows experimental steps for the production of $Ca_3Co_4O_9/Co_3O_4/CaCO_3/MgO$ and $Ca_3Co_2O_6/CaO/MgO/Ca_3Co_4O_9$ nanocomposite materials, according to certain embodiments.

Example 1: Synthesis of $Ca_3Co_4O_9/Co_3O_4/CaCO_3/MgO$ and $Ca_3Co_2O_6/CaO/MgO/Ca_3Co_4O_9$ Nanocomposites According to the present disclosure, the $Ca_3Co_4O_9/Co_3O_4/CaCO_3/MgO$ and $Ca_3Co_2O_6/CaO/MgO/Ca_3Co_4O_9$ nanocomposites were synthesized using the Pechini sol-gel method in a series of controlled steps as shown in FIG. 1B. For the synthesis of nanocomposite, about 24 grams (g) of citric acid ($HOC(CO_2H)(CH_2CO_2H)_2$) was dissolved in 50 milliliters (mL) of distilled water. Separately, 15 g of magnesium nitrate hexahydrate ($Mg(NO_3)_2 \cdot 6H_2O$), 15 g of calcium nitrate tetrahydrate ($Ca(NO_3)_2 \cdot 4H_2O$), and 15 g of cobalt acetate tetrahydrate ($Co(CH_3COO)_2 \cdot 4H_2O$) were dissolved in 200 mL of distilled water, followed by rigorous stirring. The citric acid solution prepared in the first step was then added to the nitrate and acetate solution under continuous stirring for 30 minutes. Subsequently, 15 mL of polyethylene glycol 400 was added to the resultant mixture, and the solution was further continuously stirred while being heated at 250° C. until complete evaporation of the solvents occurred. A first portion of the resultant dry powder was collected and subjected to calcination at temperature 600° C. for 3 hours to obtain the $Ca_3Co_4O_9/Co_3O_4/CaCO_3/MgO$ nanocomposite. Further, to synthesize the $Ca_3Co_2O_6/CaO/MgO/Ca_3Co_4O_9$ nanocomposite, a second portion of the dry powder was calcinated at 800° C. for 3 hours.

Figure 2A:
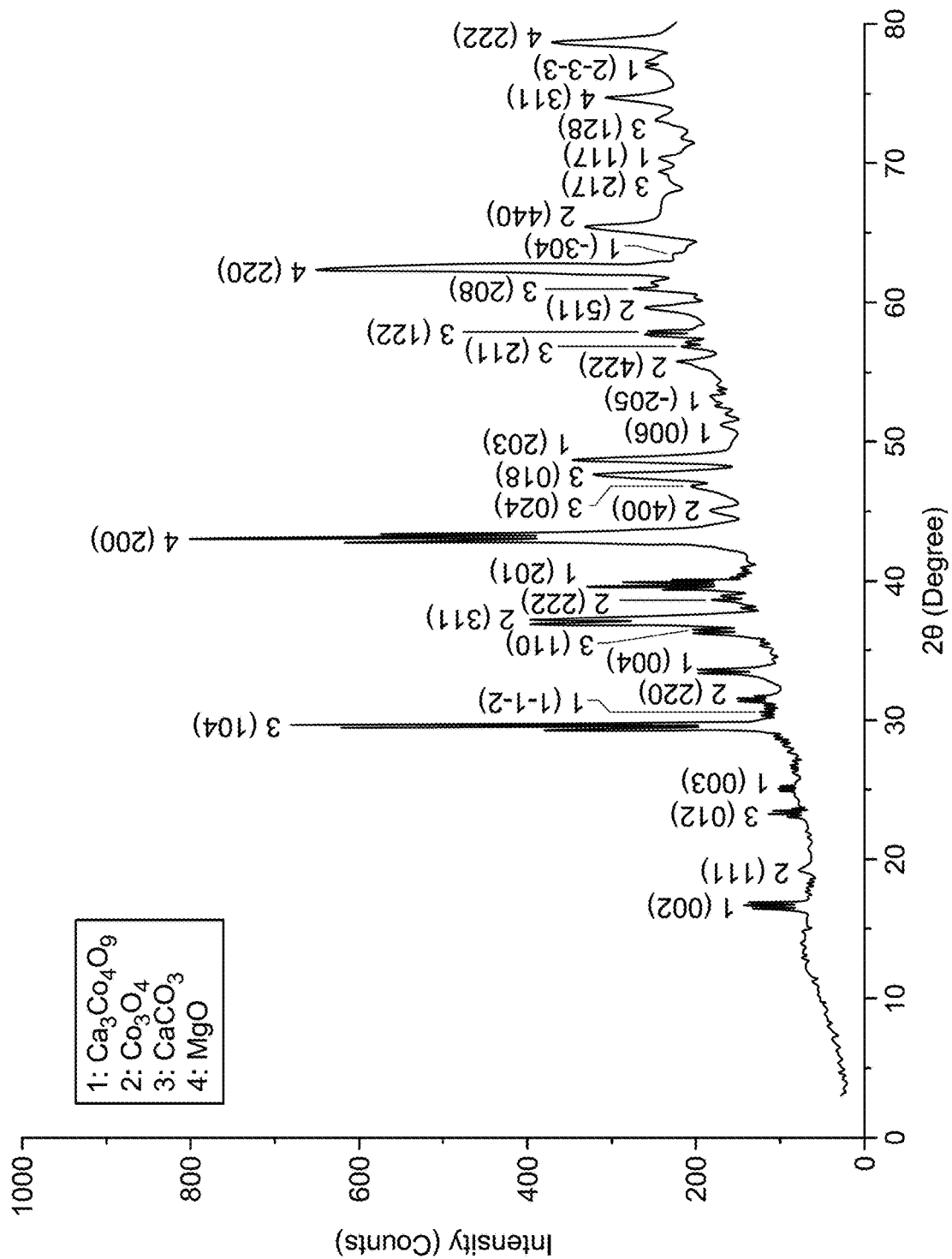
FIG. 2A shows X-ray diffraction (XRD) pattern of a $Ca_3Co_4O_9/Co_3O_4/CaCO_3/MgO$ nanocomposite synthesized at 600° C., according to certain embodiments.
Figure 2B:
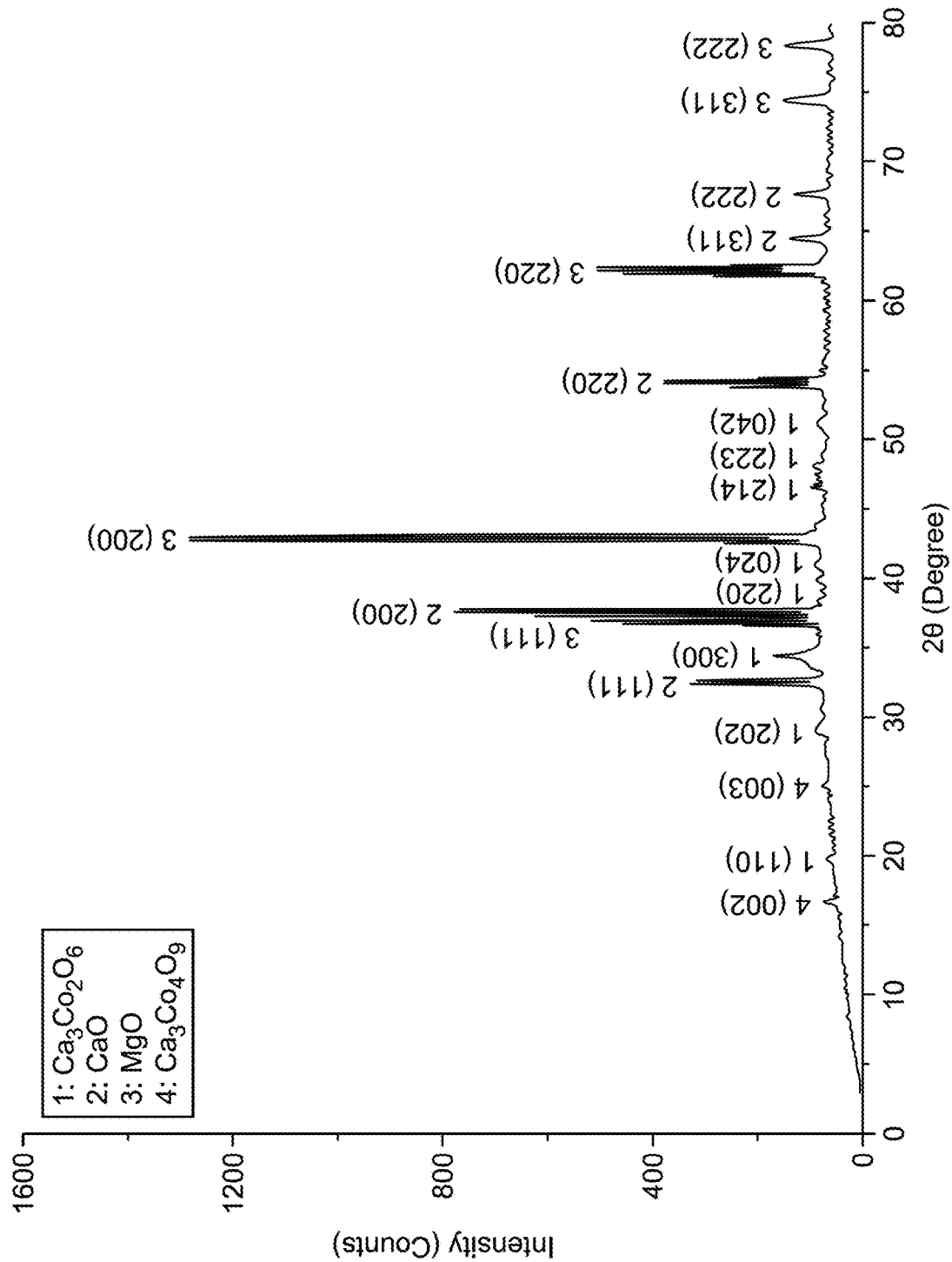
FIG. 2B shows XRD pattern of a $Ca_3Co_2O_6/CaO/MgO/Ca_3Co_4O_9$ nanocomposite synthesized at 800° C., according to certain embodiments.

The X-ray diffraction (XRD) patterns show the phase composition and crystallinity of the synthesized nanocomposites at 600° C. and 800° C., respectively, as shown in FIGS. 2A-2B. Following calcination at 600° C., the identified phases included calcium cobalt oxide ($Ca_3Co_4O_9$), confirming the monoclinic phase identified in accordance with International Centre for Diffraction Data (ICDD) entry JCPDS database (No. 00-062-0692), the disclosure of which is incorporated herein by reference in its entirety; the cubic phase of cobalt oxide ($Co_3O_4$) identified in accordance with International Centre for Diffraction Data (ICDD) entry JCPDS No. 01-071-0816, the disclosure of which is incorporated herein in its entirety; the hexagonal phase of calcite ($CaCO_3$) identified in the Crystallography Open Database (COD) No. 9000095, the disclosure of which is incorporated herein by reference in its entirety; and, cubic magnesium oxide (MgO) identified in accordance with International Centre for Diffraction Data (ICDD) entry JCPDS No. 01-075-0447, the disclosure of which is incorporated herein by reference in its entirety). For $Ca_3Co_4O_9$, the corresponding 2θ angles were 16.58°, 24.97°, 30.42°, 33.36°, 39.65°, 48.61°, 51.09°, 53.09°, 63.27°, 70.19°, and 76.92°, with Miller indices (002), (003), (1-1-2), (004), (201), (203), (006), (−205), (−304), (117), and (2-3-3), respectively. For $Co_3O_4$, the 2θ angles were 19.19°, 31.37°, 37.03°, 38.61°, 44.91°, 55.47°, 59.33°, and 65.26°, corresponding to Miller indices (111), (220), (311), (222), (400), (422), (511), and (440), respectively. For $CaCO_3$, the 2θ angles were 23.07°, 29.48°, 36.19°, 46.58°, 47.42°, 56.76°, 57.60°, 60.96°, 69.26°, and 72.92°, with Miller indices (012), (104), (110), (024), (018), (211), (122), (208), (217), and (128), respectively. MgO exhibited 2θ angles at 43.11°, 62.33°, 74.49°, and 78.59°, corresponding to Miller indices (200), (220), (311), and (222), respectively. The results of the X-Ray Diffraction analysis following calcination at 600° C. are summarized in Table 1 hereinbelow.

TABLE 1

| Components of synthesized nanocomposite at 600° C. | | | | Average crystallite size of synthesized nano-composite (nm) |
|---|---|---|---|---|
| Phase | (nm) | Card No. | Crystal system | |
| $Ca_3Co_4O_9$ | Calcium cobalt oxide | JCPDS-00-062-0692 | Monoclinic | 52.86 |
| $Co_3O_4$ | Cobalt oxide | JCPDS-01-071-0816 | Cubic | |
| $CaCO_3$ | Calcite | COD-9000095 | Hexagonal | |
| MgO | Magnesium oxide | JCPDS-01-075-0447 | Cubic | |

Following calcination at 800° C., the phases identified included: rhombohedral tricalcium dicobaltate ($Ca_3Co_2O_6$), identified in accordance with International Centre for Diffraction Data (ICDD) entry JCPDS database No. 01-075-9613, the disclosure of which is incorporated herein by reference in its entirety; cubic calcium oxide (CaO) identified in accordance with International Centre for Diffraction Data (ICDD) entry JCPDS No. 01-075-0264, the disclosure of which is incorporated herein by reference in its entirety; cubic magnesium oxide (MgO) identified in accordance with International Centre for Diffraction Data (ICDD) entry JCPDS No. 01-086-8571, the disclosure of which is incorporated herein by reference in its entirety; and, monoclinic calcium cobalt oxide ($Ca_3Co_4O_9$) identified in accordance with International Centre for Diffraction Data (ICDD) entry JCPDS No. 00-062-0692, the disclosure of which is incorporated herein by reference in its entirety. The 2θ angles for $Ca_3Co_2O_6$ were 19.61°, 28.95°, 34.19°, 39.76°, 40.82°, 46.48°, 48.06°, and 50.99°, with Miller indices (110), (202), (300), (220), (024), (214), (223), and (042), respectively. CaO exhibited 2θ angles at 32.32°, 37.45°, 54.02°, 64.31°, and 67.58°, with Miller indices (111), (200), (220), (311), and (222), respectively. MgO demonstrated 2θ angles at 36.94°, 42.69°, 62.02°, 74.29°, and 78.18°, corresponding to Miller indices (111), (200), (220), (311), and (222), respectively. Moreover, $Ca_3Co_4O_9$ exhibited 2θ angles at 16.47° and 24.86°, with Miller indices (002) and (003), respectively. The results of the X-Ray Diffraction analysis following calcination at 600° C. are summarized in Table 1 hereinbelow.

TABLE 2

| Components of synthesized nanocomposite at 800° C. | | | | Average crystallite size of synthesized nano-composite (nm) |
|---|---|---|---|---|
| Phase | Chemical name | Card No. | Crystal system | |
| $Ca_3Co_4O_6$ | Tricalcium dicobaltate | JCPDS-01-075-9613 | Rhombohedron | 67.52 |
| CaO | Calcium oxide | JCPDS-01-075-0264 | Cubic | |
| MgO | Magnesium oxide | JCPDS-01-086-8571 | Cubic | |
| $Ca_3Co_4O_9$ | Calcium cobalt oxide | JCPDS-00-062-0692 | Monoclinic | |

The average crystallite size of the synthesized nanocomposites was 52.86 nm following calcination at 600° C. and 67.52 nm following calcination at 800° C., as shown in Tables 1 and 2. The above observed increase in crystallite size at the higher temperature was attributed to enhanced grain growth and crystallinity due to thermal effects during synthesis.

Figure 3A:
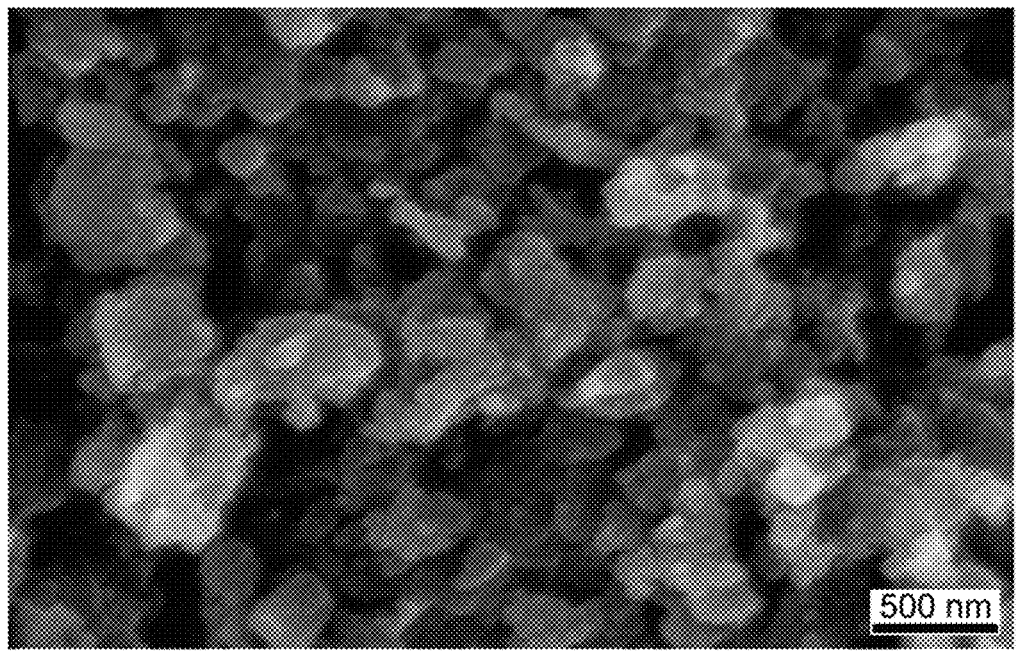
FIG. 3A is a scanning electron microscope (SEM) image of the $Ca_3Co_4O_9/Co_3O_4/CaCO_3/MgO$ nanocomposite synthesized at 600° C., at a resolution of 500 nanometers (nm), according to certain embodiments.
Figure 3B:
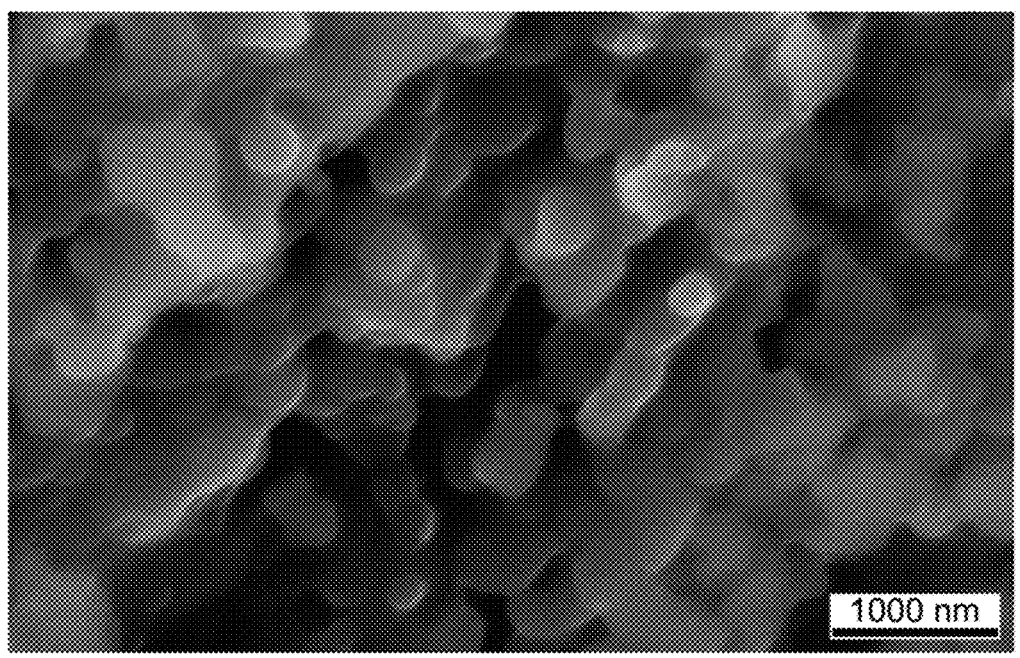
FIG. 3B is a SEM image of the $Ca_3Co_2O_6/CaO/MgO/Ca_3Co_4O_9$ nanocomposite synthesized at 800° C., at a resolution of 1000 nm, according to certain embodiments.

The SEM images of the synthesized nanocomposites are shown in FIGS. 3A-3B. FIG. 3A corresponds to the $Ca_3Co_4O_9/Co_3O_4/CaCO_3/MgO$ nanocomposite synthesized at 600° C., while FIG. 3B corresponds to the $Ca_3Co_2O_6/CaO/MgO/Ca_3Co_4O_9$ nanocomposite synthesized at 800° C. SEM analysis revealed that the morphology of both samples included spherical and agglomerated granular shapes, indicating a high degree of particle cohesion due to calcination. The average grain size of the $Ca_3Co_4O_9/Co_3O_4/CaCO_3/MgO$ nanocomposite synthesized at 600° C. was 151.80 nm, whereas the average grain size of the $Ca_3Co_2O_6/CaO/MgO/Ca_3Co_4O_9$ nanocomposite synthesized at 800° C. was 275.94 nm. The above observed increase in grain size with calcination temperature reflected the thermally driven growth of crystallites, a characteristic phenomenon during the heat treatment process that enhances the crystallinity of the materials. The morphological and structural features underscored the thermal effects on the microstructure of the synthesized nanocomposites.

Figure 4A:
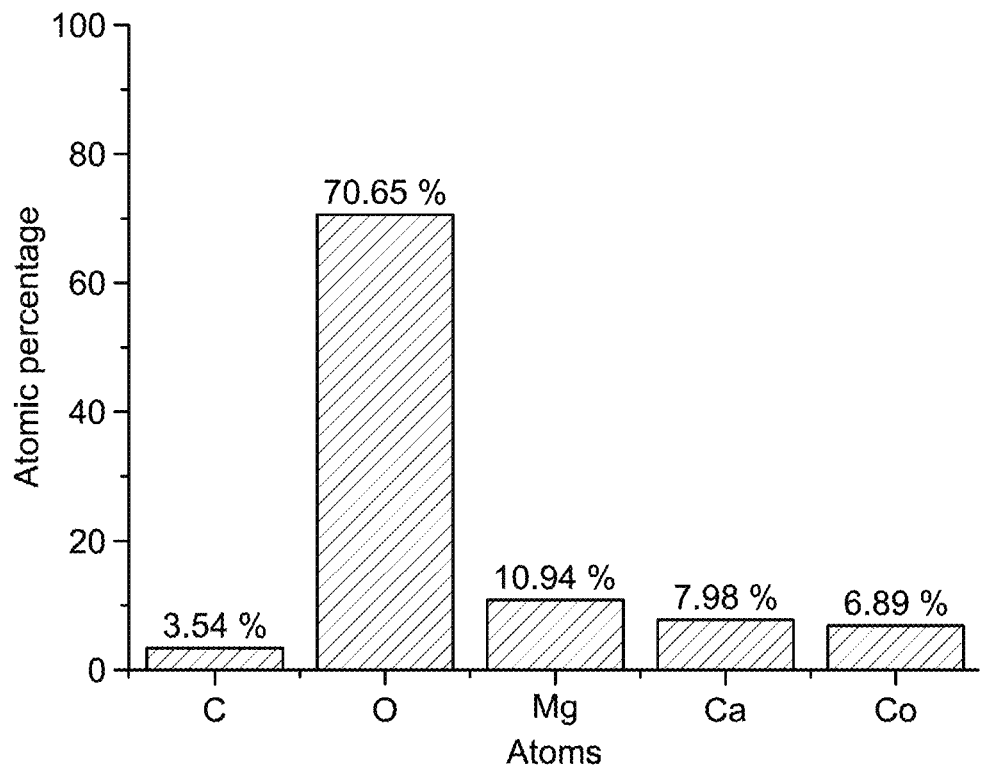
FIG. 4A is a graph depicting atomic percentage distribution of elements in the $Ca_3Co_4O_9/Co_3O_4/CaCO_3/MgO$ nanocomposite synthesized at 600° C., as determined by Energy-dispersive X-ray spectroscopic (EDX) analysis, according to certain embodiments.
Figure 4B:
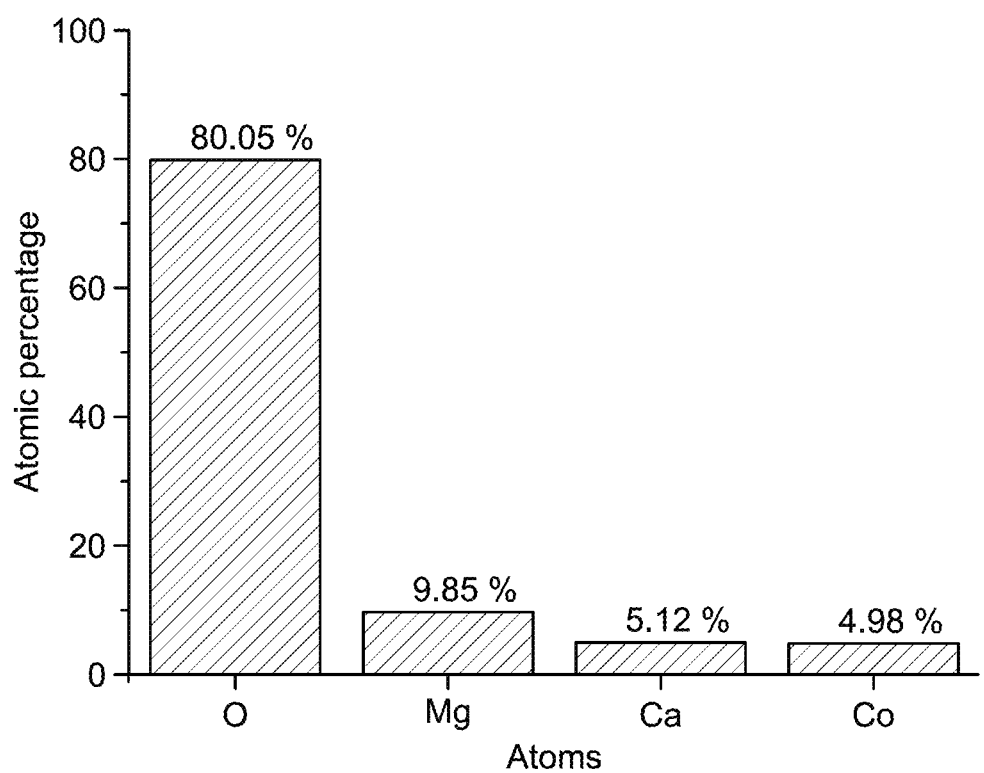
FIG. 4B is a graph depicting atomic percentage distribution of elements in the $Ca_3Co_2O_6/CaO/MgO/Ca_3Co_4O_9$ nanocomposite synthesized at 800° C., as determined by Energy-dispersive X-ray spectroscopic (EDX) analysis, according to certain embodiments.

The atomic percentage distribution of elements, shown in FIGS. 4A-4B provides insights into the chemical composition of the synthesized nanocomposites. Further, the atomic percentage distribution of elements, as determined by Energy-dispersive X-ray spectroscopic (EDX) analysis, was presented for the $Ca_3Co_4O_9/Co_3O_4/CaCO_3/MgO$ nanocomposite synthesized at 600° C. and the $Ca_3Co_2O_6/CaO/MgO/Ca_3Co_4O_9$ nanocomposite synthesized at 800° C., as shown in FIGS. 4A-4B. In the nanocomposite synthesized at 600° C., oxygen constituted the majority at 70.65%, followed by magnesium at 10.94%, calcium at 7.98%, cobalt at 6.89%, and carbon at 3.54%. Conversely, in the nanocomposite synthesized at 800° C., oxygen content increased significantly to 80.05%, while the contributions of magnesium, calcium, and cobalt decreased to 9.85%, 5.12%, and 4.98%, respectively, with carbon undetected. The observed changes in elemental distribution were attributed to thermal decomposition and phase transformation occurring at higher synthesis temperatures. The increased oxygen percentage in the sample synthesized at 800° C. indicated enhanced oxidation, while the reduction in magnesium, calcium, and cobalt percentages likely resulted from the formation of oxygen-rich phases such as $Ca_3Co_2O_6$ and $Ca_3Co_4O_9$, accompanied by a decrease in carbonate and cobalt oxide contents. The aforementioned transformations underscored the role of synthesis temperature in controlling the stoichiometry and composition of the resulting nanocomposites.

In aspects of the present disclosure, there is provided the synthesis of advanced materials by introducing distinct $Ca_3Co_4O_9/Co_3O_4/CaCO_3/MgO$ and $Ca_3Co_2O_6/CaO/MgO/Ca_3Co_4O_9$ nanocomposites, fabricated using the Pechini sol-gel method. The present disclosure introduces nanocomposites with precise phase combinations, overcoming traditional challenges, including high energy demands of the synthesis process and inconsistent properties of the resultant nanocomposite materials. Through improved synthesis and lower calcination temperatures, the sol-gel synthetic route produced consistently reproducible materials, permitting the utility of such materials in high-performance nanocomposites. XRD analysis confirmed the successful formation of precise phases with enhanced crystallinity, was influenced by calcination temperature. The $Ca_3Co_4O_9/Co_3O_4/CaCO_3/MgO$ nanocomposite synthesized at 600° C. exhibited an average crystallite size of 52.86 nm, while the $Ca_3Co_2O_6/CaO/MgO/Ca_3Co_4O_9$ nanocomposite synthesized at 800° C. showed an average crystallite size of 67.52 nm. SEM analysis revealed granular morphologies, with average grain sizes of 151.80 nm for the 600° C. sample and 275.94 nm for the 800° C. sample, demonstrating the influence of calcination temperature on grain growth. Energy-dispersive X-ray spectroscopic (EDX) analysis verified elemental distribution, highlighting oxygen as the predominant element, with magnesium, calcium, and cobalt proportions varying based on synthesis conditions. These results collectively demonstrate the originality and potential of the synthesized nanocomposites, offering advanced structural and functional properties previously unattainable, filling a critical gap in high-performance material development.

Numerous modifications and variations of the present disclosure are possible in light of the above teachings. It is, therefore, to be understood that within the scope of the appended claims, the invention may be practiced otherwise than as specifically described herein.

The invention claimed is:

1. A multiphase particulate nanocomposite material comprising, as determined by X-ray diffraction:
   a monoclinic $Ca_3Co_4O_9$ crystalline phase; and,
   a cubic MgO crystalline phase,
   wherein the multiphase nanocomposite material further comprises either:
   a hexagonal $CaCO_3$ crystalline phase and a cubic $Co_3O_4$ crystalline phase; or,
   a cubic CaO crystalline phase and a rhombohedral $Ca_3Co_2O_6$ crystalline phase; and,
   wherein the ratio by weight of the monoclinic $Ca_3Co_4O_9$ crystalline phase and the cubic MgO crystalline phase is in a range of about (0.5 to 1.5):(0.5 to 1.5).

2. The multiphase particulate nanocomposite material according to claim 1 comprising, as determined by X-ray diffraction:
   the monoclinic $Ca_3Co_4O_9$ crystalline phase; and,
   the cubic MgO crystalline phase;
   the hexagonal $CaCO_3$ crystalline phase; and,
   the cubic $Co_3O_4$ crystalline phase,
   wherein:
   the ratio by weight of the monoclinic $Ca_3Co_4O_9$ crystalline phase, the cubic MgO crystalline phase, and the sum of the hexagonal $CaCO_3$ crystalline phase and the cubic $Co_3O_4$ crystalline phase is in the range of about (0.5 to 1.5):(0.5 to 1.5):(0.5 to 1.5);
   the particulate nanocomposite comprises agglomerates of substantially spherical particles;
   the particulate nanocomposite has a volume average crystallite size, as determined by X-ray diffraction, of from about 50 to about 55 nm; and,
   the particulate nanocomposite has a median volume particle size (Dv50) of from about 140 to about 160 nm, as determined by scanning electron microscopy.

3. The multiphase particulate nanocomposite material according to claim 2, wherein the particulate nanocomposite has a volume average crystallite size, as determined by X-ray diffraction, of from about 51 to about 54 nm.

4. The multiphase particulate nanocomposite material according to claim 2, wherein the particulate nanocomposite has a median volume particle size (Dv50) of from about 145 to about 155 nm, as determined by scanning electron microscopy.

5. The multiphase particulate nanocomposite material according to claim 1 comprising, as determined by X-ray diffraction:
the monoclinic $Ca_3Co_4O_9$ crystalline phase;
the cubic MgO crystalline phase;
the cubic CaO crystalline phase; and,
the rhombohedral $Ca_3Co_2O_6$ crystalline phase,
wherein:
the ratio by weight of the monoclinic $Ca_3Co_4O_9$ crystalline phase, the cubic MgO crystalline phase and the sum of the cubic CaO crystalline phase and the rhombohedral $Ca_3Co_2O_6$ crystalline phase is in the range of about (0.5-1.5):(0.5-1.5):(0.5-1.5);
the particulate nanocomposite comprises agglomerates of substantially spherical particles;
the particulate nanocomposite has a volume average crystallite size, as determined by X-ray diffraction, of from about 65 to about 70 nm; and,
the particulate nanocomposite has a median volume particle size (Dv50) of from about 260 to about 290 nm, as determined by scanning electron microscopy.

6. The multiphase particulate nanocomposite material according to claim 5, wherein the particulate nanocomposite has a volume average crystallite size, as determined by X-ray diffraction, of from about 66 to about 69 nm.

7. The multiphase particulate nanocomposite material according to claim 5, wherein the particulate nanocomposite has a median volume particle size (Dv50) of from about 270 to about 280 nm, as determined by scanning electron microscopy.

8. A method for preparing the particulate nanocomposite material as defined in claim 1, the method comprising:
forming an aqueous mixture by adding an aqueous solution of a chelating agent to an aqueous solution of a calcium salt, a magnesium salt and a cobalt salt;
adding a polyol into the aqueous mixture to form a gel;
heating the gel under stirring at a temperature of from about 200 to about 400° C. for a sufficient duration to form a dry powder; and,
calcining the dry powder at a temperature of from about 500 to about 900° C. to form the nanocomposite material.

9. The method according to claim 8, wherein the aqueous solution of the chelating agent is added in a dropwise manner into the aqueous solution of the calcium salt, the magnesium salt and the cobalt salt.

10. The method according to claim 8, wherein:
the calcium salt is selected from the group consisting of calcium sulfate ($CaSO_4$), calcium nitrate ($Ca(NO_3)_2$), calcium chloride ($CaCl_2$)) and calcium acetate ($Ca(CH_3COO)_2$);
the magnesium salt is selected from the group consisting of magnesium sulfate ($MgSO_4$), magnesium nitrate ($Mg(NO_3)_2$), magnesium chloride ($MgCl_2$) and magnesium acetate ($Mg(CH_3COO)_2$); and,
the cobalt salt is selected from the group consisting of cobalt sulfate ($CoSO_4$), cobalt nitrate ($Co(NO_3)_2$), cobalt chloride ($CoCl_2$) and cobalt acetate ($Co(CH_3COO)_2$).

11. The method according to claim 8, wherein:
the calcium salt is calcium nitrate ($Ca(NO_3)_2$);
the magnesium salt is magnesium nitrate ($Mg(NO_3)_2$); and,
the cobalt salt is cobalt acetate ($Co(CH_3COO)_2$).

12. The method according to claim 8, wherein the chelating agent comprises at least one hydroxyalkyl carboxylic acid selected from the group consisting of citric acid, tartaric acid, malic acid, mandelic acid and 12-hydroxystearic acid.

13. The method according to claim 8, wherein the chelating agent consists of citric acid.

14. The method according to claim 8, wherein the polyol is added in a dropwise manner into the aqueous mixture.

15. The method according to claim 8, wherein the polyol has a number average molecular weight of from about 200 to about 5000 g/mol. and an hydroxyl number of from about 25 to about 500 mg KOH/g.

16. The method according to claim 8, wherein the polyol is selected from the group consisting of: polyester polyols; polyether polyols; poly(ether-ester) polyols; poly(alkylene carbonate) polyols; and, mixtures thereof.

17. The method according to claim 8, wherein the polyol comprises a polyoxy ($C_2$-$C_3$)alkylene polyol.

18. The method according to claim 17, wherein the polyol comprises a polyoxy ($C_2$-$C_3$)alkylene polyol having a number average molecular weight of from about 200 to about 5000 g/mol. and an hydroxyl number of from about 25 to about 500 mg KOH/g.

19. The method according to claim 8, wherein either:
calcining is performed at a temperature of from about 500 to about 650° C. for a duration of about 2 to about 4 hours to form the nanocomposite material comprising a hexagonal $CaCO_3$ crystalline phase and a cubic $Co_3O_4$ crystalline phase; or,
calcining is performed at a temperature of from about 750 to about 900° C. for a duration of about 2 to 4 hours to form the nanocomposite material comprising a cubic CaO crystalline phase and a rhombohedral $Ca_3Co_2O_6$ crystalline phase.

20. A method of immobilizing inorganic contaminants disposed in an aqueous medium, the method comprising contacting the aqueous medium with the particulate nanocomposite material as defined in claim 1.

* * * * *